United States Patent [19]
Holman

[11] Patent Number: 5,310,209
[45] Date of Patent: May 10, 1994

[54] VEHICLES FOR TRANSPORTATION AND DISPLAY OF ARTICLES OF MERCHANDISE

[76] Inventor: Peter Holman, 24 York Ridge Road, Willowdale, Ontario, Canada M2P 1R7

[21] Appl. No.: 16,467

[22] Filed: Feb. 11, 1993

[30] Foreign Application Priority Data

Aug. 17, 1992 [CA] Canada .................................. 2076253

[51] Int. Cl.$^5$ ............................................. B62D 33/04
[52] U.S. Cl. ................................. 280/656; 280/43.1; 280/763.1; 296/21; 312/123
[58] Field of Search .................... 280/43.1, 43.17, 656, 280/761, 763.1, DIG. 8; 296/21, 169; 211/96; 312/120, 123, 215

[56] References Cited

U.S. PATENT DOCUMENTS

| | | | |
|---|---|---|---|
| 1,327,248 | 1/1920 | Moody | 296/21 |
| 2,069,852 | 2/1937 | Ruthenburg | 296/21 |
| 3,692,350 | 9/1972 | Radtke | 296/21 |
| 3,822,798 | 7/1974 | Neff | 280/763.1 X |
| 4,019,773 | 4/1977 | Vehling | 296/21 |
| 4,480,866 | 11/1984 | Komatsu . | |
| 4,824,133 | 4/1989 | Wilson | 280/763.1 X |
| 5,108,122 | 4/1992 | Beagley | 296/21 X |

FOREIGN PATENT DOCUMENTS

| | | | |
|---|---|---|---|
| 735064 | 11/1932 | France | 296/21 |
| 1266524 | 6/1961 | France | 296/169 |
| 2191738 | 12/1987 | United Kingdom . | |

*Primary Examiner*—Brian L. Johnson

[57] ABSTRACT

Apparatus for transportation and display of demonstrations and articles of merchandise utilizes a trailer part with undercarriage for facilitating movement from one location to another and is also provided with vertically adjustable castors which can be utilized to lift the carriage clear of a floor or road surface so that the vehicle can be maneuvered on the castors alone. In order to increase the area available for product display while maintaining dimensions more suitable for transport and, at the same time, providing protection for articles being transported, a box like body is provided on or integral with the trailer, the box having open sides covered by box-like covers each cover provided with, when closed, an inward facing open side, the covers each being connected by vertical hinge arrangements to a vertical corner of the body to allow horizontal swing-out-opening, the covers including, within themselves, display spaces which are visible when the covers are opened.

6 Claims, 2 Drawing Sheets

VEHICLES FOR TRANSPORTATION AND DISPLAY OF ARTICLES OF MERCHANDISE

FIELD OF INVENTION

The present invention relates to vehicles an article supporting structure used to display articles of merchandise, for instance at an exhibition. The vehicle, according to the invention, is particularly suited for preset up and easy transportation to other locations where spaces, alloted for article display, are of a fixed size and configuration and immediately adjacent to other similar spaces. Such an arrangement of spaces is to be found at, so called, trade shows.

In order to participate in such trade shows, the normal procedure is to build display counters, shelves and cabinets etc., away from the trade show site and then assemble and set up the article display in the alloted space at the site. This is a very inconvenient procedure in that wiring for electrical power, piping for water and other needed supplies must be incorporated during the assembly. After the assembly, the articles must be set up for display and packaging, crates and the like placed out of sight or removed from the premises of the show. After the termination of the show the reverse procedure must be followed.

It will be obvious that such procedures are time consuming, labor intensive and there is always a possibility that the articles will be damaged. A more convenient way of proceeding is desirable. However, although article display vehicles are presently available they are not suitable for this usage since the spaces, being limited in size, do not allow maneuvering of known vehicles into them unless the vehicles are of such dimensions as to result in poor economy of space usage. Furthermore, it is desirable that any vehicle for this usage provide for the maximum utilization of the space when the vehicle is in position.

DESCRIPTION OF THE INVENTION

An example of known display apparatus is shown in U.S. Pat. No. 4,019,773—Vehling, F. W.—issued Apr. 26, 1977 fAI 5 and directed to a MOBILE CARPET DISPLAY CENTER. Although the display apparatus is suitable for the use specified, in the patent, it could not readily be maneuvered into a trade show space since there is no provision for close quarter maneuvering.

Other examples of equally unsuitable display apparatus are shown in U.S. Pat. Nos. 3,692,350—Radtke, C. W.—issued Sep. 19, 1972, for a MOBILE OUTDOOR DISPLAY UNIT and 4,480,866—Komatsu, S.—issued Nov. 6, 1984 and 2,069,852—Ruthenburg, L.—issued Feb. 9, 1937 for a VEHICLE FOR DISPLAYING GOODS. The apparatus shown in these patents also do not meet the requirement for maneuvering.

In addition, none of the known vehicles are specially adapted for maximizing the usage of alloted space.

SUMMARY OF THE INVENTION

It is a prime object of the present invention to provide mobile article display vehicles which are maneuverable into closely defined spaces while maintaining an excellent economy 4:)f space use.

A further object is to provide a self contained mobile display vehicle which can be substantially completely set up off the show location and readily moved and set up for article display with a minimum of time and labor cost.

A still further object of the invention is to provide a vehicle especially adapted to utilize the alloted space at an exhibition site.

In accordance with the present invention the mobile display apparatus comprises a trailer type structure with normal undercarriage and trailer hitch facilities. The display part of the apparatus can be in the form of a flat bed trailer for articles which can be transported covered with a tarpaulin or in the form of a box-like main body, preferably utilizing the flat bed as the floor thereof, provided with, at least, one box-like cover on, at least, one side. The cover being hinge connected to one vertical edge of the end of the fixed structure to allow opening outward to approximately 180 degrees. It may be desirable to divide the cover into, for instance, two equal parts, one part hinged at each end of the main structure. Furthermore, covers may be provided on both sides of the main body resulting in increased display area with a walk through possibility and maximum usage of space.

The fixed structure and the cover can each be provided with counters and shelves, as required to display the articles, with the necessary accessory piping and wiring incorporated. In order to improve the usefulness and facilitate fast and efficient set-up of a display slotted structural elements are secured in the inside corners and on the inside peripheries of the box-like structure and the covers. These slotted elements are available commercially and are eminently suited for this purpose and come in cross-sectional configurations suitable for corner and flat surface mounting with the slotted side facing outward so that hangers, shelf brackets and the like can be inserted in and locked in the slots at the appropriate locations for hangers and shelf supports. The vehicle then requires only one or two connections to be made on the site for power, water etc., the articles to be displayed being previously placed in position, off site, so that they are immediately on display when the covers are opened.

In order to facilitate maneuvering the apparatus in tight spaces casters are provided, preferably, at each of the corners of the trailer part. The casters are vertically adjustable to raise the undercarriage free of a floor or road surface whereafter the casters carry the weight of the complete apparatus and allow movement of the vehicle, in any direction, on the casters. When the vehicle is properly positioned the casters may be adjusted to allow part or all of the weight of the vehicle to rest on the undercarriage.

Alternately the casters may be fixed in position and the undercarriage raised to leave the fixed casters to support the weight of the vehicle. It is, however, desirable to provide casters which are, individually, vertically adjustable in order that on site levelling may be achieved.

BRIEF DESCRIPTION OF THE DRAWINGS

FIGS. 6 and 7 illustrate cross-sectional configurations of slotted elements adapted to hold hangers, shelf brackets and the like.

DETAILED DESCRIPTION OF THE INVENTION

Figure 1:
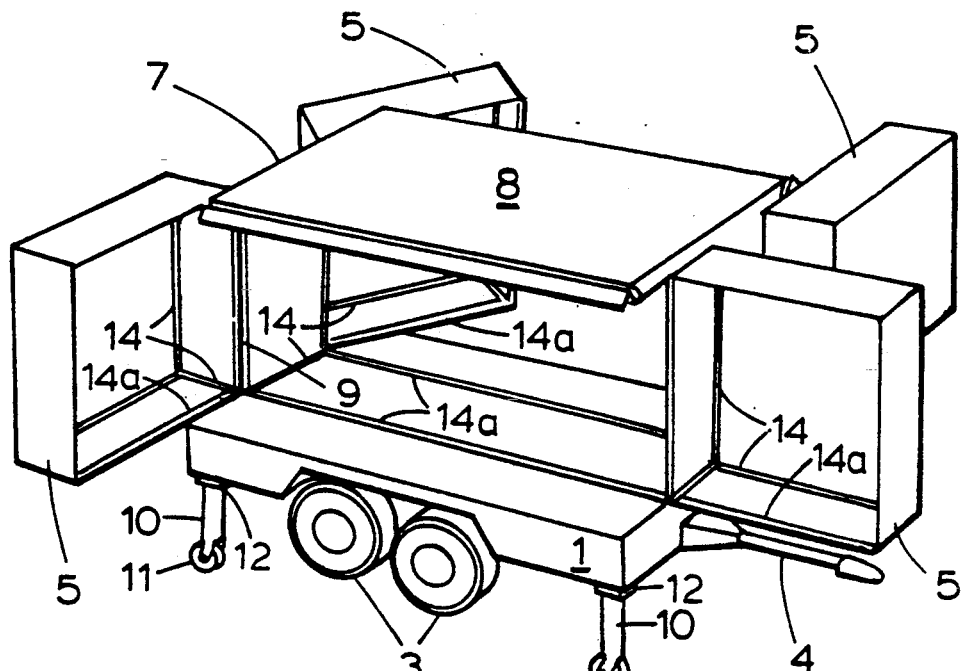
FIG. 1 shows a perspective view of the vehicle in partly open condition illustrating the versatility of article display configuration.
Figure 2:
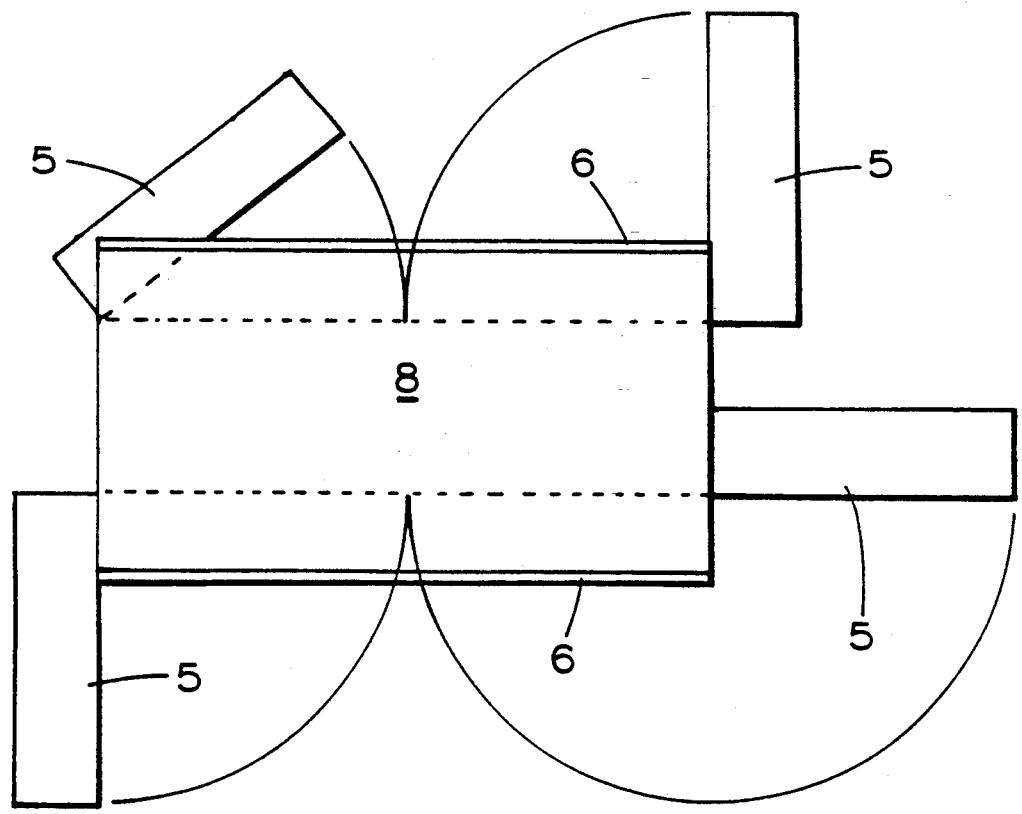
FIG. 2 shows a plan view of the mobile article display vehicle in the configuration shown in FIG. 1.

Referring to the drawings, FIGS. 1 and 2 show the article display vehicle, according to the invention, as comprising a flat bed 1 having an undercarriage 2 provided with wheels 3 and a trailer hitch 4, preferably removable, for attaching the apparatus to a motor vehicle for movement between locations.

The vehicle is shown as being provided with casters 11 supported by telescopic pipe or hydraulic cylinder means 10, 12 which provide, additional to the normal caster support, means to adjust the caster downward to lift the undercarriage wheels 3 clear of a road or floor surface, see FIG. 1, so that the vehicle, as a whole, can be minutely maneuvered, on its caster supports, into a confined space, i.e. an exhibition space. Means, not shown, are provided to lock the caster wheels and their supports in fixed positions vertically and against rolling or swiveling. The casters may be retracted slightly to allow part of the weight of the unit to rest on the undercarriage. Furthermore, the casters may be used to level the flat bed area of the vehicle if this is desirable and/or necessary.

Figure 4:
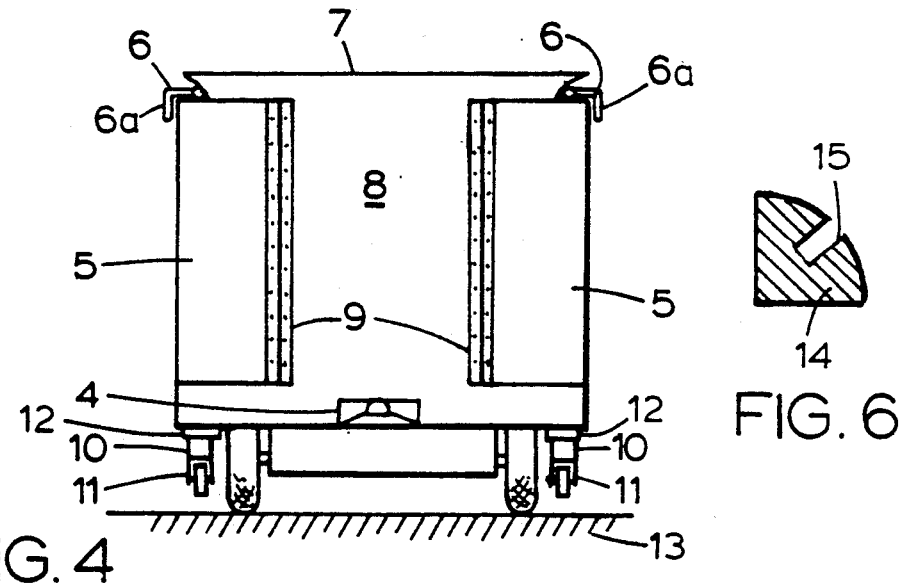
FIG. 4 shows an end view of the vehicle.
Figure 5:
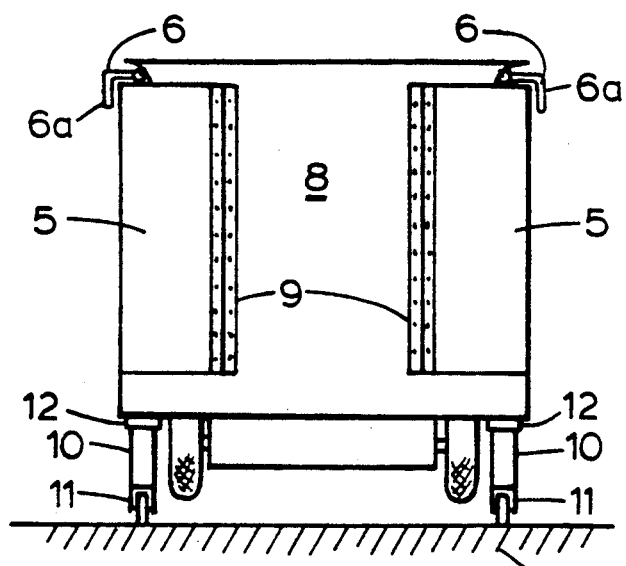
FIG. 5 shows a end view of the of FIG. 1, in a parked position, with the vehicle weight resting on the casters.

Mounted on the flat bed is a box-like main body 8 having side covers 5 which are preferably box-like in structure although it is conceivable and perhaps useful, in some instances, to omit either the top or bottom side, or both, of the cover for easier access to the inner side of the main vertical panel of the cover. The covers are hinged to the vertical end corners of the main body part 8 by hinges 9 as best shown in FIGS. 4 and 5. Preferably two equally dimensioned covers 5 are provided on each side of the main body 8 as shown in FIG. 3.

As best shown in FIGS. 1, 4 and 5, the body is provided with a roof or top side 7. Running lengthwise, on each top side of the main body part and under the outer sides of the roof are auxiliary closure flaps 6 each having a turned down outer flange 6a which overlaps the top edge of the cover. These flaps serve two purposes, they act as rain shields for the covers and the structure as a whole and, furthermore, when the structure is closed the flaps prevent inadvertent opening of the covers.

Figure 3:
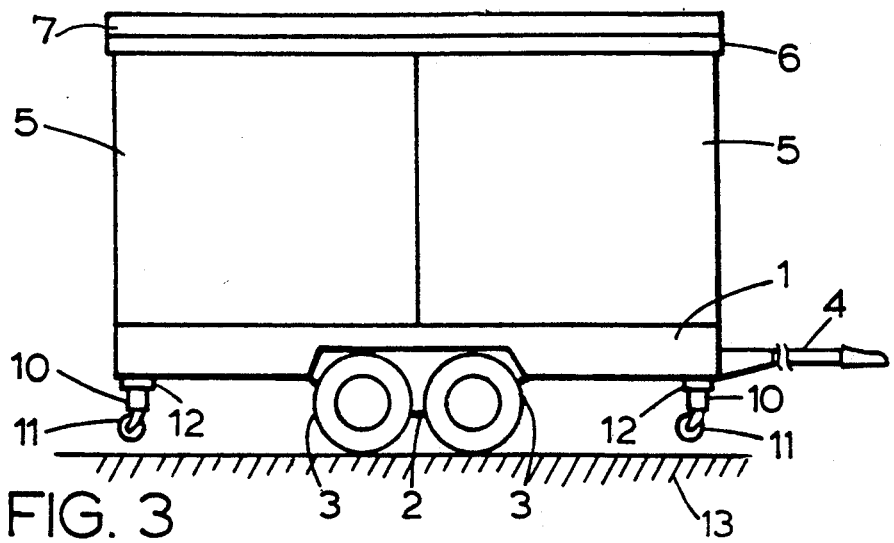
FIG. 3 shows a side view of the vehicle of FIG. 1 in a closed configuration.

Referring now to FIGS. 1, 3 and 5, caster supports 12, preferably in the form of hydraulic cylinders, are shown located at the corners of the vehicle. The supports 12 are provided with telescoped parts 10, for instance secured to a piston movable in a cylinder 12, which parts are provided, at their lower extremities with caster wheels 11 which are shown in FIGS. 1 and 5 as supporting the weight of the vehicle, the undercarriage wheels 3 being raised clear of the floor or road surface 13 thus allowing for the maneuvering of the vehicle on the caster wheels 11. Individual adjustment of the casters can be used for levelling of the trailer as required for the display.

Figure 6:
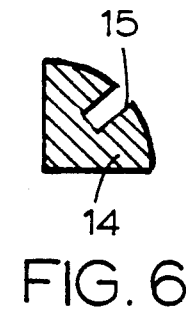
Figure 7:
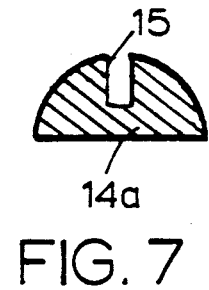

In order to facilitate easy set-up of a display and provide a wide choice of arrangements, the box 8 and the covers 5 are provided with slotted structural elements 14, shown in heavy line in FIG. 1, on the inside perimeter edges of the box-like structure and the covers as well as in the inside corners of the box-like structure and the covers. The slotted elements have cross-sectional configurations suitable for corner (quarter round), FIG. 6, and flat surface (partial sphere), FIG. 7, mounting where the slots 15 face inward to provide a longitudinal lock-in slots for hangers and shelf brackets arrangeable in a great variety of configurations. With this facility provided integral with the box-like structure an exhibiter is free to exhibit in an individualistic manner. The box-like structure, complete with structural elements may in itself constitute a separate unit conveniently removable from the trailer part to constitute a portable display container and be transported separately to an exhibition site. The vehicle, according to the invention, is the basic display vehicle. Shelving, lighting, power and water supplies etc. can be incorporated in the box-like structure as needed to facilitate the display of particular articles of merchandise and in a manner which requires only one connection for each particular supply. The apparatus can be completely outfitted, for instance, at the products-to-be-displayed source so that it is only necessary to connect supply sources after the apparatus is maneuvered into the allotted space at the exhibition site, thus saving time and labor. In addition, problems that may arise in the setting up of the display can be solved at the source location. Since exhibition spaces are standardized the vehicle can be dimensioned to make the most efficient use of the space available.

Although a simple embodiment of the invention is disclosed it will be obvious that variations of the embodiment described may be made which do not depart from the spirit and scope of the invention as defined in the appended claims. For instance, there may be one or more covers per side of the box-like structure, one side of the box may be closed and fill panels and the like may be used to enhance the display. Adjustment of the caster supports may be manually or electrical powered. In addition, there may be three or more casters provided for maneuvering and the hitch and supporting tongue made retractable into the bed of the vehicle.

The embodiments of the invention in which an exclusive property or privileges is claimed are defined as follows:

1. A vehicle for the transportation and display of articles of merchandise comprises:

A trailer provided with an undercarriage for facilitating mobility and a rectangular platform secured to the undercarriage, a vertically adjustable castor secured to the underside of each corner of the platform, the castors, when adjusted downward, with respect to the platform, being capable of lifting the undercarriage free of a vehicle supporting surface, a rectangular box-type housing mounted on the platform, the housing being provided with, at least, one swing-out cover on, at least, one longitudinal side of the housing, the cover being connected, by a hinge, to a vertical corner of one end of the housing whereby the cover can be opened outwardly 180 degrees to extend the length of the vehicle and a display area for articles of merchandise, the cover being in the form of an open sided box, which open side faces inward when the cover is in a closed position, the top of the housing being provided with a longitudinal closure flap having, at a longitudinal outside edge thereof, a turned down flange which extends downward over an outside top edge of the closed cover, the flap being provided with a longitudinal hinge connection, at an inner, longitudinal, edge of the flap, to the top of the housing whereby the outer edge of the flap can be raised, with respect to the top of the housing, to lift the flange clear of the cover and allow opening of the cover.

2. The vehicle as claimed in claim 1, wherein the housing is provided with two equal length doors on one, at least, side of the housing.

3. The vehicle as claimed in claim 1, wherein the castors are individually vertically adjustable with respect to each other.

4. The vehicle as claimed in claim 1, wherein the cover is provided with shelving for supporting articles of merchandise.

5. A vehicle for the transportation and display of articles of merchandise comprises:

A trailer provided with an undercarriage for facilitating mobility and a rectangular platform secured to the undercarriage, a vertically adjustable castor secured to the underside of each corner of the platform, the castors, when adjusted downward, with respect to the platform, being capable of lifting the undercarriage free of a vehicle supporting surface, a rectangular box-type housing mounted on the platform, the housing being provided with two swing-out covers on each longitudinal side of the housing, each cover being connected, by a hinge, to a vertical corner of one end of the housing whereby the cover can be opened outwardly 180 degrees to extend the length of the vehicle and a display area for articles of merchandise, each cover being in the form of an open sided box, which open side faces inward when the cover is in a closed position, the top of the housing, on each longitudinal side thereof, being provided with a longitudinal closure flap, each flap having, at a longitudinal outside edge thereof, a turned down flange which extends downward over an outside top edge of the closed covers on one side of the housing, each flap being provided with a longitudinal hinge connection, at an inner, longitudinal, edge of the flap, to the top of the housing whereby the outer edge of the flap can be raised, with respect to the top of the housing, to lift the flange clear of the covers on one side of the housing and allow opening of the covers.

6. The vehicle as claimed in claim 5, the castors are vertically adjustable with respect to each other to provide for levelling of the trailer.

* * * * *